United States Patent
Metzger et al.

(10) Patent No.: US 7,418,699 B2
(45) Date of Patent: Aug. 26, 2008

(54) METHOD AND SYSTEM FOR PERFORMING LINK-TIME CODE OPTIMIZATION WITHOUT ADDITIONAL CODE ANALYSIS

(75) Inventors: Markus T. Metzger, Neu-Ulm (DE); Khem Raj, Ulm (DE); Oender Karpat, Ulm (DE); Robert Wiesner, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 831 days.

(21) Appl. No.: 10/784,072

(22) Filed: Feb. 20, 2004

(65) Prior Publication Data

US 2005/0188362 A1    Aug. 25, 2005

(51) Int. Cl.
    *G06F 9/45*    (2006.01)
(52) U.S. Cl. ...................................... 717/162
(58) Field of Classification Search ................. 717/162
    See application file for complete search history.

(56) References Cited

U.S. PATENT DOCUMENTS

| 5,848,275 | A | 12/1998 | Maydan et al. | |
| 6,738,967 | B1 * | 5/2004 | Radigan | 717/146 |
| 7,000,227 | B1 * | 2/2006 | Henry | 717/152 |
| 7,086,044 | B2 * | 8/2006 | Hanson et al. | 717/151 |
| 2004/0194073 | A1 * | 9/2004 | Chan et al. | 717/151 |

OTHER PUBLICATIONS

Granston, E., et al., "Automatic Recommendation of Compiler Options", http://www.cesr.ncsu.edu/fddo4/papers/granston.pdf. (Dec. 1, 2001).
Levine, J. R., "Linkers & Loaders", Morgan Kaufmann, San Francisco, (Jan. 15, 2000), 237.
Muchnick, S. S., "Advanced Compiler Design & Implementation", Morgan kaufmann, San Francisco, (Aug. 15, 1997).
Pan, Z., et al., "Rating Compiler Optimization for Automatic Performance Tuning", *Proceedings of the ACM/IEEE SC2004*, Supercomputing, 2004, (Nov. 6, 2004), 14-14.
Triantafyllis, S., et al., "Compiler Optimiation-Space Exploration", *Proceedings of the International Symposium on Code Generation and Optimiation*, Computer Society, (Mar. 23, 2003), 204-215.

* cited by examiner

*Primary Examiner*—John Chavis
(74) *Attorney, Agent, or Firm*—L. Cho

(57) ABSTRACT

A system for performing code optimization is described which includes an optimizing analyzer within a compiler to generate a first optimizing transformation and a second optimizing transformation and their satisfying conditions for a compiled code. An optimization transformation module is placed within a linker to determine which of the first and second optimizing transformations should be selected when the compiled code is linked with other compiled codes, and to execute the selected one of the first and second optimizing transformations at link-time. A method of performing code optimization is also described.

16 Claims, 6 Drawing Sheets

METHOD AND SYSTEM FOR PERFORMING LINK-TIME CODE OPTIMIZATION WITHOUT ADDITIONAL CODE ANALYSIS

TECHNICAL FIELD

Embodiments of the present invention pertain to compilation and execution of software programs. More specifically, embodiments of the present invention relate to a method and system for performing link-time code optimization to program codes without additional code analysis of the program codes at link-time.

BACKGROUND

Object-Oriented Programming Languages (OOPLs) have been developed to improve the productivity of developing software programs. The OOPLs typically include Java (developed by Sun Microsystems, Inc.) and other programming languages conforming to CLI (Common Language Infrastructure)(developed by Microsoft Corporation). Employing OOPLs, program developers can create small, reusable sections of program code known as "objects". The objects, once created, can be quickly and easily combined and re-used to create new programs.

Compilation for a software program written in such languages typically involves having each of its objects in source code format individually compiled by a compiler into a processor-executable native or machine code file (i.e., compiled object file). The compiled object files are then processed by a linker, which combines the compiled object files to produce a complete executable program. The executable program is then eligible for execution on a computer system.

To improve the performance of the executable program, the program needs to be optimized during compilation. One prior solution to optimize the executable program is to have each of the compilers perform the optimizing transformations to the object file it compiles. Known optimization operations performed by a compiler typically include base binding, function cloning, and partial evaluation.

However, one problem of the above-described prior solution is that the compilers cannot have the knowledge of the entire program (i.e., lacks the "whole program view") during compilation because the program contains object files that are compiled separately. This means that many optimizing transformation operations at compile-time depend on information that is only available at link-time of the program. Thus, even though a compiler is capable of performing an optimizing transformation operation based on a particular piece of information, the compiler may not be able to do so if the required information for the optimization operation is not available at that time. The linker, on the other hand, is not powerful enough to perform any optimizing transformation operation, which typically requires heavy analysis of the program code and knowledge of the target instruction set structure. A linker does not require code analysis and knowledge of target instruction structure during linking.

One prior solution to the above-described problems is to employ a link-time optimizer that optimizes the entire executable program at link-time. However, the prior link-time optimizer is typically a heavyweight tool, which typically makes the link-time optimization much more expensive than the compile-time optimization. In addition, the link-time optimizer needs to perform its own code analysis for the optimizing transformation (i.e., not being able to take advantage of the code analysis performed by the compiler).

Thus, there exists a need for a method and system of performing link-time code optimization without additional code analysis.

BRIEF DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

Figure 1:
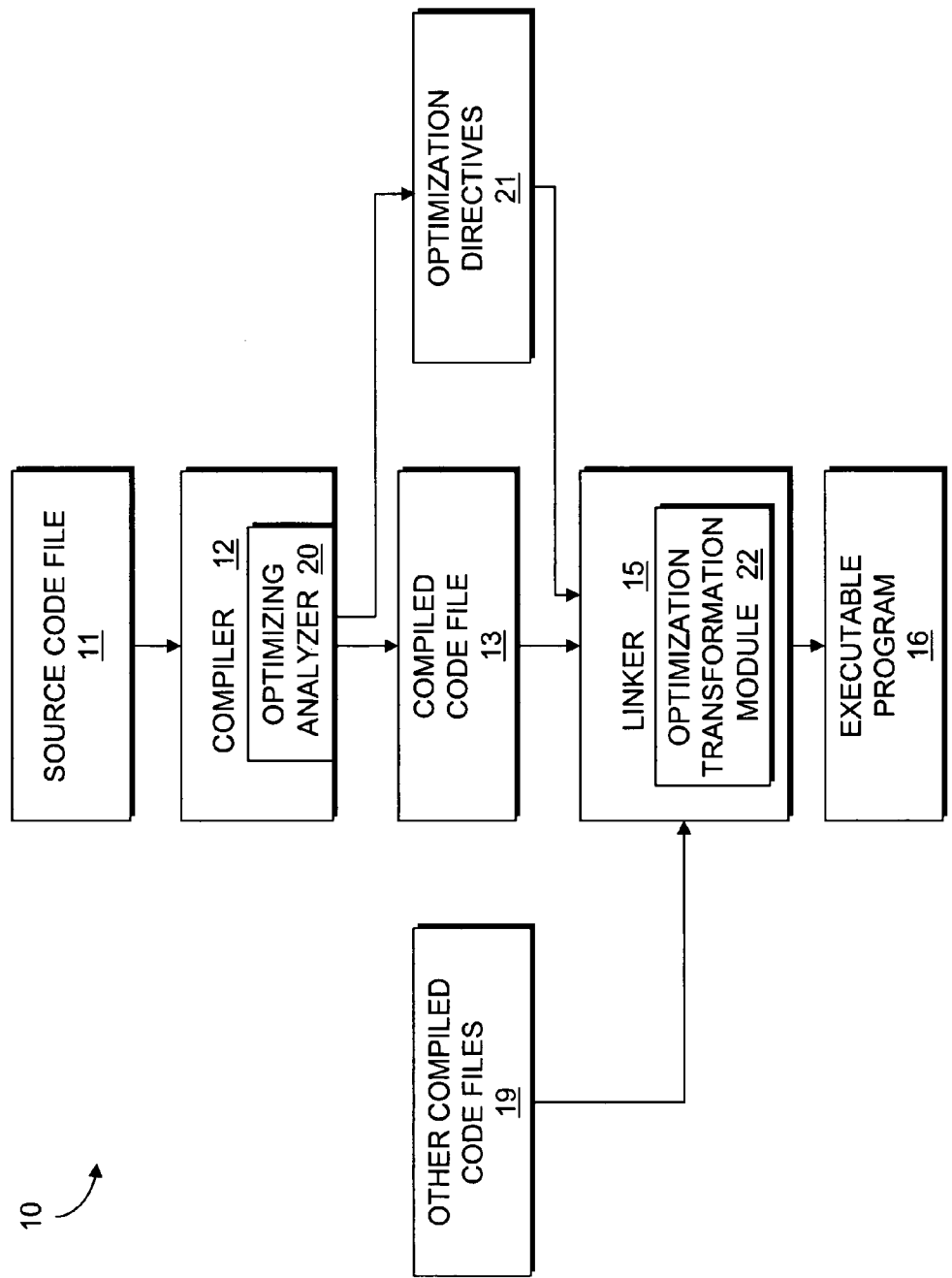
FIG. 1 shows a compilation environment that includes an optimizing analyzer and an optimization transformation module that implement one embodiment of the present invention.

FIG. 1 shows a compilation environment 10 that includes an optimizing analyzer 20 and an optimization transformation module 22 that perform link-time code optimization to a compiled code file 13 without additional code analysis in accordance with one embodiment of the present invention. In other words, the optimizing analyzer 20 and the optimization transformation module 22 allow the compiled code file 13 to receive link-time optimization transformations that are specified during compile-time of the compiled code file 13.

As will be described in more detail below and in accordance with one embodiment of the present invention, the optimizing analyzer 20 is within a compiler 12 of the compilation environment 10. The optimization transformation module 22 is within a linker 15 of the compilation environment 10. Due to the unavailability of information that can only become available when the compiled code file 13 is linked with other compiled code files 19 into an executable program 16 at link-time, the compiler 12 cannot perform every code optimization specified for the compiled code file 13 at compile-time. Thus, the optimizing analyzer 20 generates optimization directives 21 that specify at least a first optimizing transformation and a second optimizing transformation and their satisfying conditions for each optimization that cannot be performed by the compiler 12. The information can be referred to as the whole-program-view data or global data.

The optimization directives 21 are then sent to the optimization transformation module 22. When the linker 15 links the compiled code file 13 with the other compiled code files 19, the optimization transformation module 22 checks the conditions against the whole-program-view data that are available at link-time to determine which of the first and second optimizing transformations should be selected. The optimization transformation module 22 then executes the selected one of the first and second optimizing transformations at link-time for the executable program 16. The optimizing analyzer 20, the optimization transformation module 22, and their functions will be described in more detail below, also in conjunction with FIGS. 1 through 6.

As can be seen from FIG. 1, the compilation environment 10 is used to turn a software program that contains multiple objects or modules (including the source code file 11) into the executable program 16. This means that the source code file 11 is one of a number of objects or modules of the software program to be compiled. Each of the objects or modules is written by some user in some known high level programming language. Each of the objects or modules (including the source code file 11) can be referred to as a program file (or code file). In one embodiment, the programming language employed is the C++ programming language. In another embodiment, the programming language is Java (developed by Sun Microsystems, Inc.).

The compiler 12 of the compilation environment 10 is used to compile the source code file 11 into the compiled code file 13. The compiler 12 may also be used to compile other code files of the software program into the other compiled code files 19. However, the compiler 12 compiles one code file at one time. The linker 15 of the compilation environment 10 is used to link the compiled code file 13 with the other compiled code files 19 to produce the executable program 16. To combine the compiled object files 13 and 19 to generate the executable program 16, the linker 15 performs a number of operations (e.g., section allocation, data allocation, symbol handling, and relocation). For example, the linker 15 binds symbols to addresses and performs relocation operations. A relocation operation is essentially the patching of a memory word with the address of a given symbol. The compiler 12 determines which type of relocation operation is needed at certain place of the compiled code file 13 while the linker 15 executes the actual patching.

The compiled code files 13 and 19 may be native code that can be directly executed on a data processing or computer system when linked together into the executable program 16. The term native code means machine code that is particular to a specific architecture or platform. Alternatively, the compiled code files 13 and 19 (and thus the executable program 16) can also be an intermediate language code (e.g., Java byte-code) that may then be interpreted or subsequently compiled by a just-in-time (JIT) compiler within a runtime system (or virtual machine) into native or machine code that can be executed by a platform-specific target computer system.

The source code file 11 can be stored in a memory of a computer system (both not shown) before being compiled by the compiler 12. The compiled code files 13 and 19 can be stored in, for example, a memory of a computer system (both not shown) that will execute the executable program 16. In one embodiment, the source code file 11, the compiled code files 13 and 19, and the executable program 16 are stored in a memory of the same computer system. In an alternative embodiment, the source code file 11, the compiled code files 13 and 19, and the executable program 16 are stored in different computer systems.

The compiler 12 is a software system hosted by (or run on) the computer system. The linker 15 is also a software system hosted by (or run on) the computer system. The computer system can be, for example, a personal computer, a personal digital assistant, a network computer, a server computer, a notebook computer, a workstation, a mainframe computer, or a supercomputer. Alternatively, the computer system can be of any other electronic system with data processing capabilities.

The computer system includes an operating system (not shown) and system-specific hardware (not shown). The operating system can be an open standard Linux operating system or other type of operating system. The system-specific hardware of the computer system can be any hardware that includes all necessary modules to execute the operating system sufficiently. This includes a processor or microprocessor as CPU of the computer system.

The compiler 12 also performs code optimization to the code file it compiles. This means that the compiler 12 performs code optimization to the compiled code file 13. The compiler 12 performs code optimization to improve the performance of the compiled code file 13. The code optimization includes, for example, address base binding code transformation, function cloning code transformation, and data allocation code transformation.

However, the compiler 12 is not able to perform all the prescribed code optimizations to the code file it compiles. This is due to the fact that symbol references or address constants in the source code file 11 may reference data or code defined in other source code files that are compiled into the other compiled code files 19. When the compiler 12 compiles the source code file 11 into the compiled code file 13, the compiler 12 cannot know the information in the other files as they are compiled separately. For example, if symbol references or address constants in the compiled code file 13 refer to code or data defined in the other compiled code files 19, the compiler 12 cannot obtain that information during compilation. Because the compiler 12 does not have knowledge of the entire program (i.e., the executable program 16) to which the compiled code file 13 belongs during compilation (i.e., no whole-program-view data), the compiler 12 is not able to define and perform those code optimizations that require the whole-program-view data.

In this case and in accordance with one embodiment of the present invention, the compiler 12 employs the optimizing analyzer 20 to generate the optimization directives 21 for those code optimizations that cannot be performed in the compiler 20 due to the unavailability of the whole-program-view data (or global data). The optimization directives 21 define those optimizations in conditional format. This means that the optimization directives 21 specify some suggested optimizing transformations, each with a qualifying condition. According to one embodiment, the optimization directives 21 specify at least a first suggested optimizing transformation and a second suggested optimizing transformation and their satisfying conditions for each optimization that cannot be performed by the compiler 12.

The first and second optimizing transformations and their satisfying conditions can be, for example, in the form of conditional relocation operations. The first and second optimizing transformations and their satisfying conditions can also be in the form of conditional selection of sections. Moreover, the optimizing analyzer 20 may generate more optimizing transformations than the first and second optimizing transformations for each optimization that cannot be completed in the compiler 12.

The optimization directives 21 are then sent to the optimization transformation module 22. When the linker 15 links the compiled code file 13 with the other compiled code files 19, the optimization transformation module 22 checks the conditions in the optimization directives 21 against the whole-program-view data that are available at link-time to determine which of the first and second optimizing transformations should be selected. The optimization transformation module 22 then executes the selected one of the first and second optimizing transformations at link-time for the executable program 16.

For example, consider the following code sequence or instruction set

```
LDR R0,=foo
.Lbar$Ref:
LDR R1,=bar
```

The first is a load instruction that loads the address of the symbol "foo" into register R0. The third is also a load instruction that loads the address of the symbol "bar" into register R1. The second is a symbol definition that specifies the address of the next instruction. In this case, if the symbol "foo" or "bar" is a global symbol, where the symbol "foo" or "bar" is laid out can only be known at link-time. Thus, the compiler 12 cannot perform any optimizing transformation to the address definition ".Lbar$Ref:". But the compiler 12 can tell how to perform the optimization if given the distance between the symbols "foo" and "bar". In this case, the optimizing analyzer 22 generates the optimization directives 21 as follows

```
.Lbar$Ref:=(((bar-foo)<2^8)
?(addi r1, r0, bar-foo)
:(.Lbar$Ref)
```

Here, the optimization directives 21 specify the optimization transformation ".Lbar$Ref:" as a conditional one. This means that if the distance of the symbols "foo" and "bar" is less than $2^8$, the original ".Lbar$Ref:" transformation is replaced with an ADD operation (see the second instruction in the optimization directives 21). Otherwise the original ".Lbar$Ref:" is selected and performed.

When the optimization transformation module 22 receives the above-listed optimization directives, it evaluates the condition (i.e., whether the distance of the symbols "foo" and "bar" is less than $2^8$). If so, the optimization transformation module 22 causes the linker 15 to perform the ADD instruction (i.e., the second instruction). Otherwise, the optimization transformation module 22 causes the linker 15 to perform the original optimization transformation on ".Lbar$Ref:" of LDR R1,=bar.

In one embodiment, the optimization directives 21 are part of the compiled code file 13. In another embodiment, the optimization directives 21 are separate from the compiled code file 13.

This compiler-directed link-time optimizing transformation in accordance with one embodiment of the present invention can be applied, for example, to the address base binding optimizing transformation, the function cloning optimizing transformation, and the data allocation optimizing transformation. In the address base binding optimizing transformation, because the final layout of global variables in the compiled files 13 and 19 is determined by the linker 15 at link-time, the compiler 12 can only perform base binding (i.e., compute the address of a variable from the address of another global variable) for a global variable defined in the compiled code file 13. In this case, the optimizing analyzer 20 specifies different base binding optimizing transformations based on the relative distance between symbolic addresses (i.e., conditions for those transformations). Once the addresses are known at link-time, the optimization transformation module 22 checks the conditions to determine which base binding optimizing transformations shall be performed. The optimization transformation module 22 then performs the selected base binding optimizing transformations.

In the function cloning optimizing transformation, a function clone (i.e., a specialized version of a function), though much more efficient than the function itself, is only applicable to a function call with certain parameter values. However, this information may only be made available at link-time. Thus, the optimizing analyzer 20 specifies the conditions (e.g., certain call sites for certain parameter values of a function) and instructs the optimization transformation module 22 to select the most appropriate version (i.e., the function itself of its clone) for a given call site based on the conditions.

Figure 2:
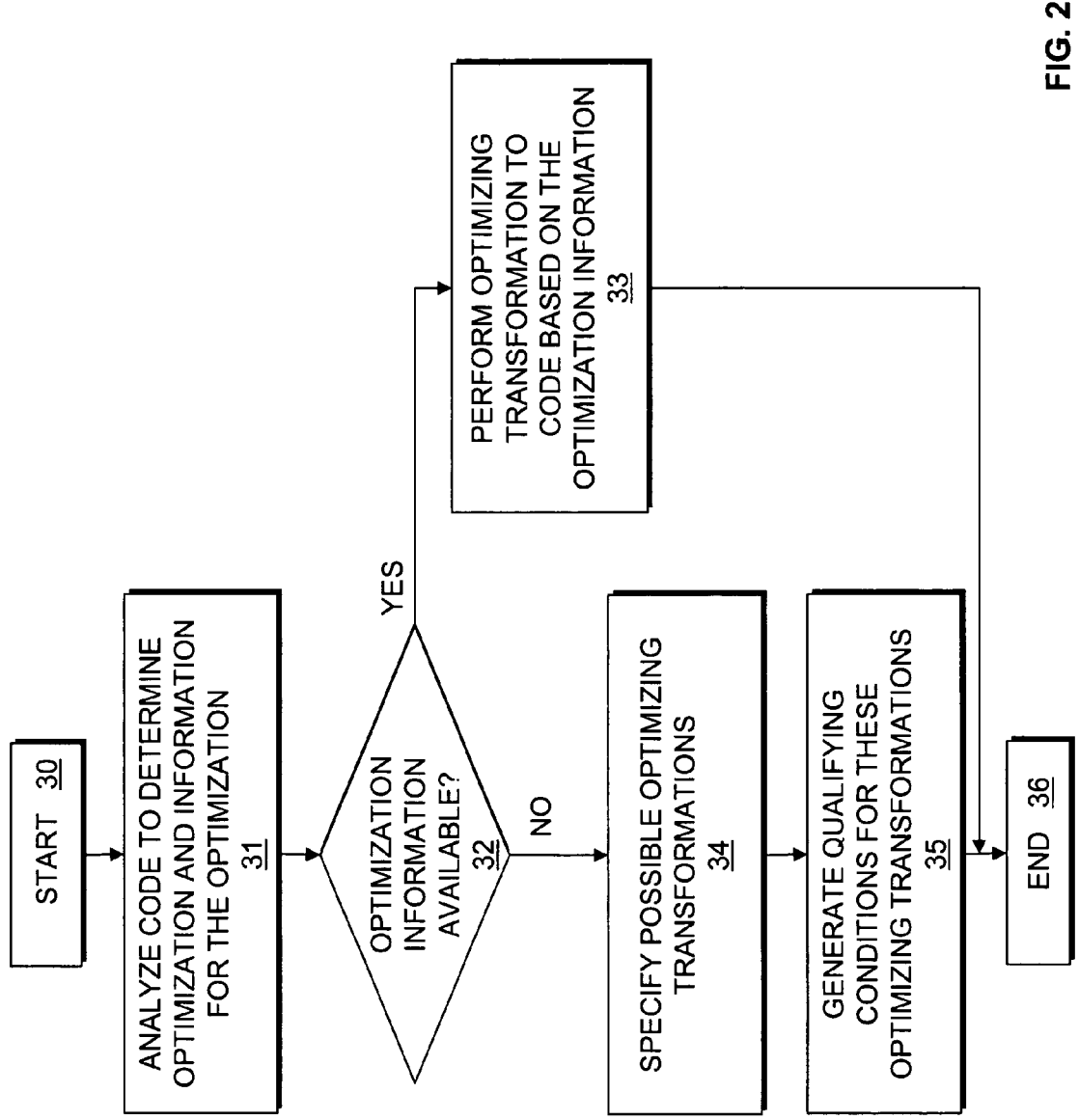
FIG. 2 is a flowchart diagram showing, in general, the optimizing analysis process performed by the optimizing analyzer of FIG. 1.
Figure 3:
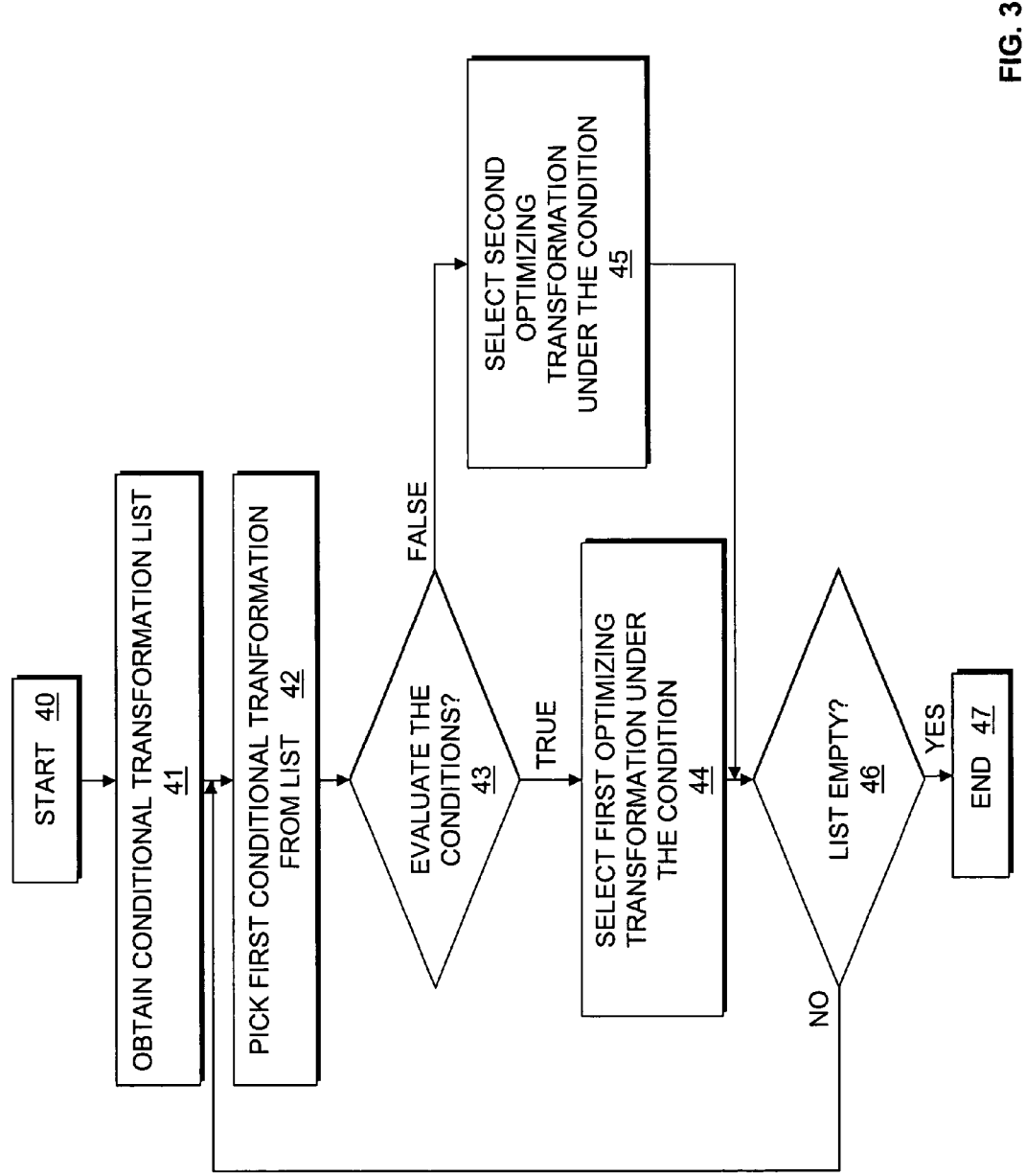
FIG. 3 is a flowchart diagram showing, in general, the optimization transformation process performed by the optimization transformation module of FIG. 1.

In one embodiment, each of the optimizing analyzer 20 and the optimization transformation module 22 is implemented using software technology. Alternatively, each of the optimizing analyzer 20 and the optimization transformation module 22 can be implemented using other technology. For example, each of the optimizing analyzer 20 and the optimization transformation module 22 may be implemented as firmware. FIG. 2 shows, in general, the optimizing analysis process performed by the optimizing analyzer 20 while FIG. 3 shows, in general, the optimization transformation process performed by the optimization transformation module 22.

As can be seen from FIG. 2, the optimizing analysis process starts with code analysis of the compiled code file 13 (FIG. 1) to determine what optimization is needed and what information is needed for the optimization (i.e., block 31 in FIG. 2). Here, the information needed for the optimization can be referred to as optimization information. According to one embodiment of the present invention, the optimizing analyzer 20 (FIG. 1) performs this code analysis. Alternatively, this code analysis may be performed by the compiler 12 (FIG. 1).

At 32, it is determined whether the optimization information is available to the compiler 12 or not. According to one embodiment of the present invention, the optimizing analyzer 20 makes this determination. If the answer is yes (i.e., the optimization information is available), the optimizing analysis process moves to block 33. If, however, the optimization information is determined not to be available to the compiler 12, then the optimizing analysis process moves to block 34.

At 33, because the optimization information for the specified optimization operation has been determined to be available, the optimization operation is performed based on the optimization information. According to one embodiment of the present invention, the optimizing analyzer 20 causes the compiler 12 to perform the optimization operation (or optimizing transformation) based on the optimization information. Then the process ends at block 36.

At 34, because the optimization information is not available, only possible optimizing transformations are specified. According to one embodiment of the present invention, the optimizing analyzer 20 specifies the possible optimizing transformations. In one embodiment, the optimizing analyzer 20 specifies a first and a second possible optimizing transformations. In another embodiment, the optimizing analyzer 20 specifies more possible optimizing transformations than the first and second possible optimizing transformations.

At 35, qualifying conditions for these possible optimizing transformations are generated. In accordance with one embodiment of the present invention, the optimizing analyzer 20 generates the qualifying conditions. The process then ends at block 36.

As described above, FIG. 3 shows the optimization transformation process. As can be seen from FIG. 3, the optimization transformation process starts with obtaining the list that contains all the conditional optimization transformation candidates (i.e., block 41). According to one embodiment of the present invention, the optimization transformation module 22 (FIG. 1) obtains the list.

At 42, a first conditional optimization transformation candidate is picked from the list. According to one embodiment of the present invention, the optimization transformation module 22 picks the candidate. As described above in connection with FIGS. 1 and 2, each optimization transformation candidate specifies a first and a second possible optimizing transformations and their satisfying conditions.

At 43, the associated conditions are evaluated with information available at link-time from the linker 15 (FIG. 1). According one embodiment of the present invention, the optimization transformation module 22 makes this determination. In one embodiment, the conditions for the first and second optimizing transformations are mutually exclusive. In this case, if the condition for the first optimizing transformation is satisfied (i.e., the evaluation indicates TRUE), then the process moves to block 44. If, however, the condition for the second optimizing transformation is satisfied (i.e., the evaluation indicates FALSE), then the process moves to block 45.

At 44, the first optimizing transformation is selected under the condition. In accordance with one embodiment of the present invention, the optimization transformation module 22 makes the selection. Then the process moves to block 46.

At 45, the second optimizing transformation is selected under the condition. In accordance with one embodiment of the present invention, the optimization transformation module 22 makes the selection. Then the process moves to block 46.

At 46, it is determined whether the list is empty or not. According to one embodiment of the present invention, the optimization transformation module 22 (FIG. 1) makes this determination. If the list is empty, then the process ends at block 47. If the list is not empty, then the process returns to block 42 for further processing.

Figure 4:
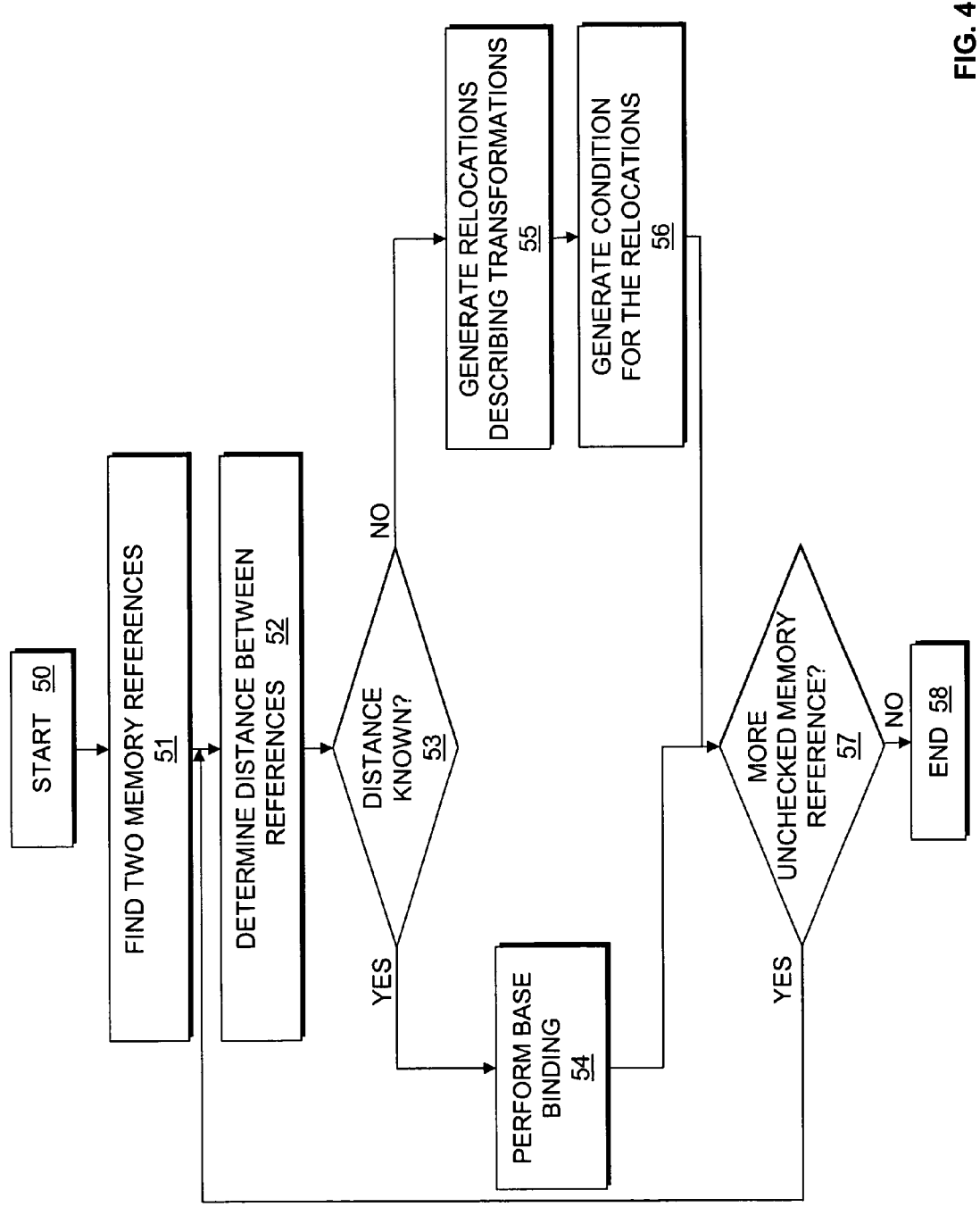
FIG. 4 is a flowchart diagram showing the specific base binding optimizing analysis process performed by the optimizing analyzer of FIG. 1.
Figure 5:
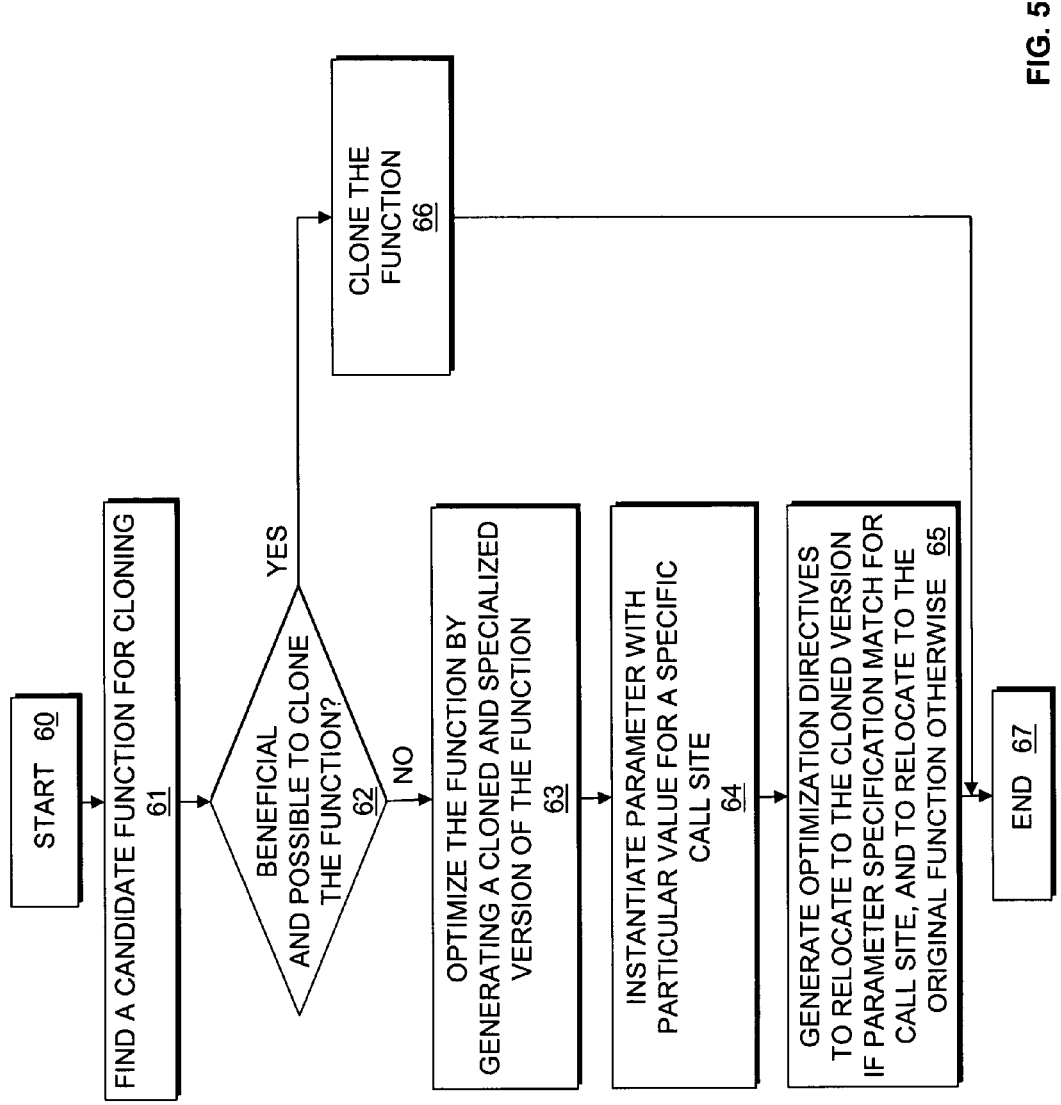
FIG. 5 is a flowchart diagram showing the specific function cloning optimizing analysis process performed by the optimizing analyzer of FIG. 1.
Figure 6:
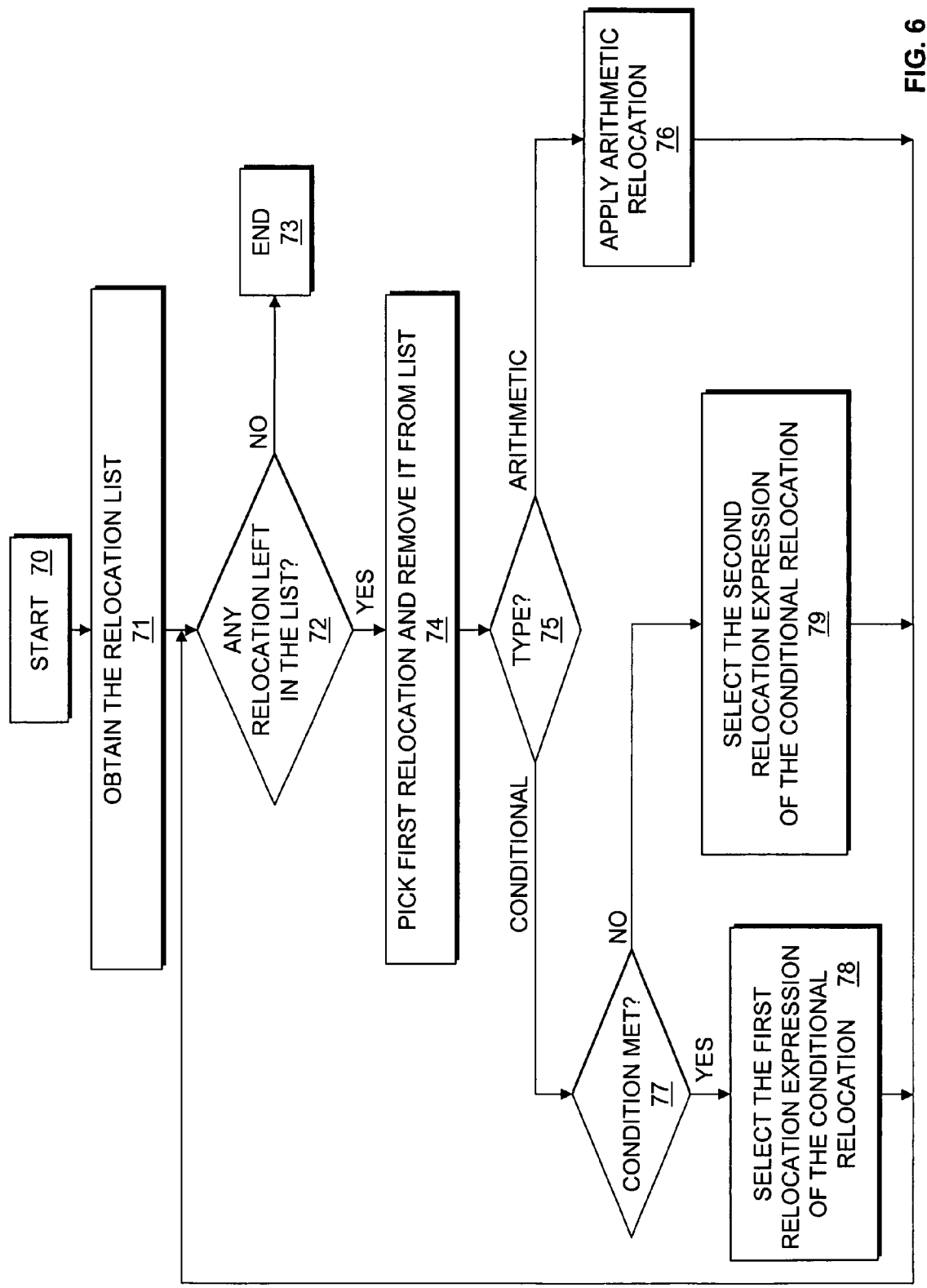
FIG. 6 is a flowchart diagram showing the optimization transformation process for address base binding and function cloning performed by the optimization transformation module of FIG. 1.

FIGS. 4 through 6 show in flow-chart diagram form some specific examples of the optimizing analysis process by the optimizing analyzer 20 (FIG. 1) and the optimization transformation process by the optimization transformation module 22 (FIG. 1). For example, FIG. 4 shows the address base binding optimizing analysis process while FIG. 5 shows the function cloning optimizing analysis process. FIG. 6 shows the optimization transformation process for both the address base binding and function cloning.

As can be seen from FIG. 4, the optimizing analysis process for address base binding starts with finding two memory references (i.e., block 51). According to one embodiment of the present invention, the optimizing analyzer 20 (FIG. 1) performs this operation. Alternatively, this operation can be performed by the compiler 12 (FIG. 1).

At 52, the distance between the two references is determined. According to one embodiment of the present invention, the optimizing analyzer 20 makes this determination. Alternatively, this determination may be made by the compiler 12.

At 53, it is determined whether the distance is known or not (i.e., whether the distance can be determined). According to one embodiment of the present invention, the optimizing analyzer 20 makes this determination. If the distance is known (i.e., YES), then the process moves to block 54. If the distance is not known (i.e., NO), then the process moves to block 55.

At 54, because the distance is known, the base binding can be performed. In accordance with one embodiment of the present invention, the optimizing analyzer 20 causes the compiler 12 to perform the base binding optimization. Here, the compiler 12 replaces one memory reference of a "LOAD-SYMBOL-ADDRESS" instruction with an "ADD" instruction that adds the distance value to the previously loaded symbol address. The process then moves to block 57.

At 55, relocations describing the base binding optimizing transformations are generated. According to one embodiment of the present invention, the optimizing analyzer 20 generates the relocations. In one embodiment, the optimizing analyzer 20 generates a first and a second relocation. Alternatively, the optimizing analyzer 20 generates more than two relocations.

At 56, qualifying conditions are generated for each of the relocations. This makes each relocation operation a conditional relocation operation. According to one embodiment of the present invention, the optimizing analyzer 20 generates the conditions. Each condition assumes that the distance is within a predetermined value (e.g., greater than, less than, or equal to). As described above, the distance will be known at link-time because the memory references or symbolic addresses will be known at link-time. The process then moves to block 57.

At 57, it is determined whether there are more unchecked memory references. According to one embodiment of the present invention, the optimizing analyzer 20 makes this determination. If it is determined that there are more unchecked memory references, the process moves back to block 51. Otherwise, the process ends at block 58.

As can be seen from FIG. 5, the optimizing analysis process for function cloning starts with finding a candidate function for cloning (i.e., block 61). According to one embodiment of the present invention, the optimizing analyzer 20 (FIG. 1) performs this operation.

At 62, it is determined whether it is both beneficial and possible to clone the function. As described above, a function clone (i.e., a specialized version of a function), though much more efficient than the function itself, is only applicable to a function call with certain parameter value. This information may not be available at compile-time. Thus, it may not be possible to perform the function cloning optimization by the compiler 12 (FIG. 1) at compile-time. In accordance with one embodiment of the present invention, the optimizing analyzer 20 makes the determination whether it is beneficial and possible to clone the function. If it is both beneficial and possible to clone the function, then process moves to block 66. If, on the other hand, it is determined that it is not possible to clone the function at compile-time, then the process moves to block 63.

At 63, the function is optimized by generating a cloned and specialized version of the function. According to one embodiment of the present invention, the optimizing analyzer 20 does this optimization. In accordance with another embodiment, the optimizing analyzer 20 causes the compiler 12 to optimize the function by generating the cloned version of the function.

At 64, the parameter of the function is instantiated with a particular value for a specific call site. This is to specify qualifying conditions for adopting either the function or its cloned version. According to one embodiment of the present invention, the analyzer 20 instantiates the parameter.

At 65, the optimizing directives are generated. In one embodiment of the present invention, the analyzer 20 generates the optimizing directives to instruct the optimization transformation module 22 (FIG. 1) to relocate to the cloned version if the parameter specification matches for the specified call site, and to relocate to the function itself if the parameter specification does not match for the specified call site. In other words, the optimizing directives instruct the optimization transformation module 22 to select the appropriate version (i.e., the function itself of its cloned version) for a given call site based on the conditions. The process then ends at block 67.

At 66, the function is cloned. According to one embodiment of the present invention, the optimizing analyzer 20 causes the compiler 12 to clone the function (or perform the cloning to the function). The process then ends at block 67.

As described above, FIG. 6 shows the optimization transformation process for both the address base binding and function cloning. As can be seen from FIG. 6, the optimization transformation process starts with obtaining the list that contains all candidates for the relocation operation (i.e., block 71). According to one embodiment of the present invention, the optimization transformation module 22 (FIG. 1) performs this operation. Here, each relocation candidate is either a conditional relocation (because it contains both the specified relocation operation and its qualifying condition) or a regular arithmetic relocation. In addition and in one embodiment, each conditional relocation includes a first relocation expression with its qualifying condition and a second relocation expression with its qualifying condition. In one embodiment, the qualifying conditions are mutually exclusive conditions.

At 72, it is determined whether there is any relocation candidate left in the list. According to one embodiment of the present invention, the optimization transformation module 22 makes the determination. If there is nothing left in the list, the process ends at block 73. If, however, there is at least one relocation candidate left in the list, then the process moves to block 74.

At 74, the first relocation candidate is picked and removed from the list. According to one embodiment of the present invention, the optimization transformation module 22 performs this function.

At 75, it is determined whether the relocation is a conditional relocation or just a regular arithmetic relocation operation. According to one embodiment of the present invention, the optimization transformation module 22 makes the determination. If the relocation is a conditional relocation, then the process moves to block 77. If the relocation is just a regular arithmetic relocation, then the process moves to block 76.

At 76, the specified arithmetic relocation is applied. According to one embodiment of the present invention, the optimization transformation module 22 causes the linker 15 (FIG. 1) to apply the arithmetic relocation. The process then moves to block 72.

At 77, the condition of the conditional relocation is checked to see if the condition is met. According to one embodiment of the present invention, the optimization transformation module 22 makes.

At 78, the first relocation expression of the conditional relocation is selected and executed. According to one embodiment of the present invention, the optimization transformation module 22 makes the selection and causes the linker 15 to execute the selected first relocation expression. The process then moves back to block 72.

At 79, the second relocation expression of the conditional relocation is selected and executed. According to one embodiment of the present invention, the optimization transformation module 22 makes the selection and causes the linker 15 to execute the selected second relocation expression. The process then moves to block 72.

The compiler-directed link-time optimization technique described above in accordance with embodiments of the present invention can also be applied to enhance other compiler optimizations. For example, in data allocation optimization (i.e., data locality) where the final layout of global data can only be determined at link-time, the above-described technique in accordance with one embodiment can be used. Data allocation optimization is designed to improve the caching behavior of a compiled code. It determines that, for each function, what data are heavily used data (or hot data) and what data are not-heavily-used data (or cold data). Then the heavily used data are allocated near each other in memory and separate from the not-heavily-used data. However, since the final layout of global data can only be determined at link-time, the optimizing analyzer 20 (FIG. 1) can propose a data layout that is most beneficial for the current code file being compiled by the compiler 12 (FIG. 1). This information is then sent to the optimization transformation module 22 (FIG. 1) as linker directives. The optimization transformation module 22 can then gather all proposed data layouts from all the compiled code files to be linked together to select a data layout that is most beneficial for the entire program. As a further example, the above-described technique in accordance with one embodiment can be used for conditional selection of sections.

FIGS. 2-6 are flow charts illustrating optimizing analysis processes and optimizing transformation processes according to embodiments of the present invention. Some of the procedures illustrated in the figures may be performed sequentially, in parallel or in an order other than that which is described. It should be appreciated that not all of the procedures described are required, that additional procedures may be added, and that some of the illustrated procedures may be substituted with other procedures.

In the foregoing specification, the embodiments of the present invention have been described with reference to specific exemplary embodiments thereof. It will, however, be evident that various modifications and changes may be made thereto without departing from the broader spirit and scope of the embodiments of the present invention. The specification and drawings are, accordingly, to be regarded in an illustrative rather than restrictive sense.

What is claimed is:

1. A computer-implemented compilation environment, comprising:
   a computer system;
   a software compiler run on the computer system to compile a source code into a compiled code;
   a software linker run on the computer system to link the compiled code with other separately compiled codes into an executable program;
   an optimizing analyzer within the compiler and also run on the computer system to generate a first optimizing transformation and a second optimizing transformation and their satisfying conditions for the compiled code without knowing information regarding the other separately compiled codes at compile-time; and
   an optimization transformation module within the linker and also run on the computer system to determine, at link-time and with knowledge of the information of the other separately compiled codes, which of the first and second optimizing transformations should be selected when the compiled code is linked with the other separately compiled codes, and to execute the selected one of the first and second optimizing transformations at link-time.

2. The compilation environment of claim 1, wherein the optimization transformation module determines which of the first and second optimizing transformations should be selected by checking the satisfying conditions with information only available at link-time.

3. The compilation environment of claim 1, wherein the first and second optimizing transformations and their satisfying conditions are in the form of conditional relocation operations.

4. The compilation environment of claim 1, wherein the first and second optimizing transformations are selected from a group comprising address base binding optimizing transformations, function cloning optimizing transformations, and data allocation optimizing transformations.

5. A method of performing code optimization, comprising generating, at compile-time, a first optimizing transformation and a second optimizing transformation and their satisfying conditions for a compiled code which is to be linked with other separately compiled codes into an executable program at link-time, wherein generating the first and second optimization transformations and their satisfying conditions is done without knowing information regarding the other compiled codes at compile-time;

determining, at link-time and with knowledge of the information of the other separately compiled codes, which of the first and second optimizing transformations should be selected when the compiled code is linked with other compiled codes; and executing the selected one of the first and second optimizing transformations at link-time.

6. The method of claim 5, wherein the first and second optimizing transformations and their satisfying conditions are generated in the form of conditional relocations.

7. The method of claim 5, wherein determining which of the first and second optimizing transformations should be selected further comprises checking the satisfying conditions with information only available at link-time to determine which of the first and second optimizing transformations should be selected.

8. The method of claim 5, wherein the first and second optimizing transformations are address base binding optimizing transformations.

9. The method of claim 5, wherein the first and second optimizing transformations are data allocation optimizing transformations.

10. The method of claim 5, wherein the first and second optimizing transformations are function cloning optimizing transformations.

11. An article of manufacture comprising a machine accessible medium including sequences of instructions, the sequences of instructions including instructions which, when executed, cause the machine to perform:

generating, at compile-time, a first optimizing transformation and a second optimizing transformation and their satisfying conditions for a compiled code which is to be linked with other separately compiled codes into an executable program at link-time, wherein generating the first and second optimization transformations and their satisfying conditions is done without knowing information regarding the other compiled codes at compiler-time;

determining, at link-time and with knowledge of the information of the other separately compiled codes, which of the first and second optimizing transformations should be selected when the compiled code is linked with other compiled codes; and executing the selected one of the first and second optimizing transformations at link-time.

12. The article of manufacture of claim 11, wherein the first and second optimizing transformations and their satisfying conditions are generated in the form of conditional relocations.

13. The article of manufacture of claim 11, wherein determining which of the first and second optimizing transformations should be selected further comprises checking the satisfying conditions with information only available at link-time to determine which of the first and second optimizing transformations should be selected.

14. The article of manufacture of claim 11, wherein the first and second optimizing transformations are address base binding optimizing transformations.

15. The article of manufacture of claim 11, wherein the first and second optimizing transformations are function cloning optimizing transformations.

16. The article of manufacture of claim 11, wherein the first and second optimizing transformations are data allocation optimizing transformations.

* * * * *